This invention relates to and has for an object the provision of an improved needle valve for controlling the flow of a fluid in a simple and reliable manner.

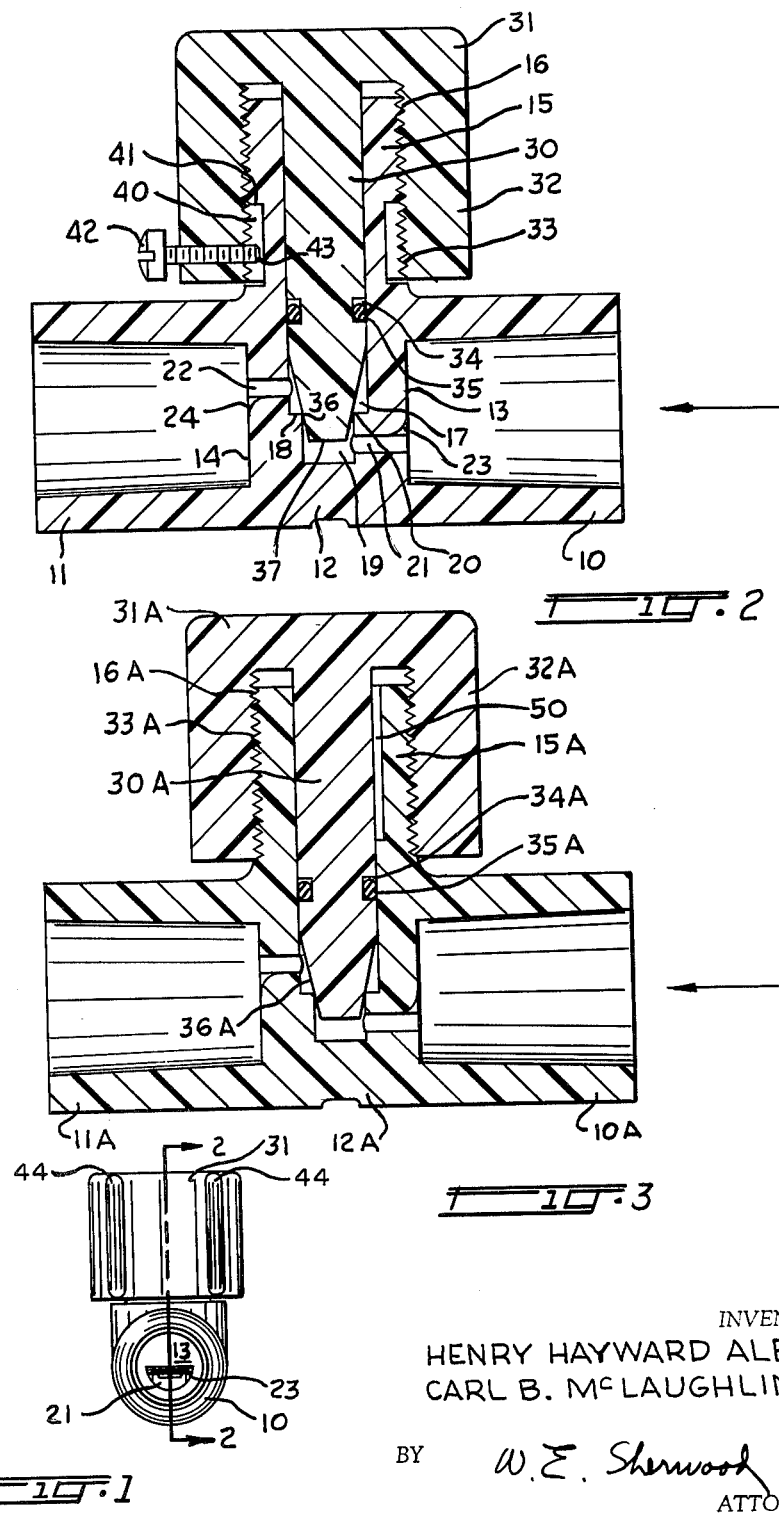
INVENTORS
HENRY HAYWARD ALBRO
CARL B. McLAUGHLIN
BY  W. E. Sherwood
ATTORNEY 3,255,775
NEEDLE VALVE
Henry Hayward Albro and Carl B. McLaughlin, Louisville, Ky., assignors, by mesne assignments, to Cabot Corporation, Boston, Mass., a corporation of Delaware
Filed Oct. 8, 1962, Ser. No. 228,992
3 Claims. (Cl. 137—553)

Another object is to provide a needle valve having a flow-controlling needle carried by a movable part and a valve seat supported by a stationary part, each being constructed of a deformable synthetic plastic material effecting a mutual deformation with a resulting reliable seal when the needle is brought into contact with the seat.

A further object is to provide a needle valve assembly of low overall height and with a minimum of separate elements.

A still further object is to provide a needle valve assembly having means for indicating fully open flow conditions.

Other objects and advantages will become apparent as the description proceeds and when considered in conjunction with the accompanying drawings in which:

FIG. 1 is an end elevation of one form of valve embodying the invention,

FIG. 2 is a sectional view taken on line 2—2 of FIG. 1, and to a larger scale, and FIG. 3 is a view similar to FIG. 2 and showing a modified form of valve.

Referring more particularly to the disclosure in FIGS. 1 and 2, the novel and improved valve of the invention comprises as a first part a one-piece valve body formed of a suitable synthetic plastic material which is characterized by its resistance to chemical corrosion, its ability to be molded with close tolerances, its light weight as compared with metal, and its modulus of elasticity which permits it to deform under suitable stressing. Various such plastics may be used with the valve parts now to be described, but we prefer to employ unplasticized polyvinyl chloride. The valve body which may be molded by conventional techniques, includes axially aligned tubular end portions 10 and 11 to which conduits (not shown) may be suitably connected, and an integral web portion 12 extending transversely of the axis of the body and defined by walls 13 and 14.

Projecting laterally from and integral with the web portion is a cylinder 15 the distal end of which is exteriorly threaded as at 16. Extending lengthwise of this cylinder is a needle guide bore 17 of right cylindrical shape and terminating in the central region of the web with a generally flat floor 18. Beneath this floor and communicating with the guide bore is a recess 19 of circular cross-section and which forms at its junction with that bore a circular valve seat which has a diameter less than that of said bore. A circular valve seat 20 of deformable material and which, under initial closing pressure of the needle, is substantially a line contact thereagainst, accordingly is provided. A passage 21 extends from the upstream tubular end of the valve body to the recess 19 and another passage 22 extends from the bore 17 to the downstream tubular end of the valve body. In order to improve flow characteristics for the fluid passing through the valve body these passages are molded with the enlarged arcuate inlets and outlets 23 and 24 respectively in the walls 13 and 14 of the web portion.

The valve also includes as a second part, a one-piece combined needle and actuator therefor formed of suitable synthetic plastic material, preferably the same type of material as that comprising the valve body. This second part includes an elongated needle 30 of right cylindrical shape adapted to fit within the needle bore 17 with a close tolerance, for example, in the order of 0.005 inch on the diameter. At its outer end the needle is formed integrally with its actuator comprising a hollow cap 31, including a reentrant wall 32 extending to within a short distance from the valve body when the valve is fully closed. This wall is interiorly threaded as at 33 along its entire inner surface and coacts with the exterior threads 16 on the cylinder to move the needle toward and away from the valve seat as the cap is rotated in the appropriate direction. Suitable means, such as ribs 44 (FIG. 1), may be molded on the exterior of the cap to assist in manual manipulation thereof. The tolerance of fit between the respective threads 16 and 33 is greater than the tolerance between the needle and its bore.

As best shown in FIG. 2, the needle is formed with a circumferential groove 34 intermediate its ends and within this groove a conventional O-ring 35 of neoprene or the like is mounted for sealing engagement with the inner surface of bore 17. At a short distance from this groove the needle is then tapered with a uniform conical surface 36 toward its innermost end 37.

As will now be apparent, when the cap 31 is screwed in a closing direction the lower end portion of the needle first closes upon valve seat 20, and, after the initial contact generally along a circular line, further rotation of the cap causes a mutual deformation of the valve seat and needle adding to the area of contact therebetween and to the sealing action provided. In contrast with conventional needle valves formed of metal and having dual sealing means, one of which is positioned adjacent the end of the needle when in closed position, this invention makes use of the material of the needle and seat to afford a reliable seal and thus avoids the necessity for an extra element in the combination.

When the valve is to be opened the cap is turned in a retracting direction and after contact between the needle and seat is broken, fluid flows in a controlled manner through the valve body. It is a feature of the invention that the assembly has a minimum of parts and possesses a low overall height. This advantage, however, makes it more difficult to determine by mere observation the setting of the needle with respect to the seat at any given time and additional provision, therefore, is made for warning the operator of the approach of the respective two parts of the assembly toward their disengagement from each other. This may take the form of a positive warning as shown in FIG. 2, wherein the operator is prevented from detaching the two parts, or a passive warning as shown in FIG. 3 wherein the operator is merely admonished to stop the unscrewing movement of the cap.

Referring first to FIG. 2, the cylinder 15 is formed with a circumferential external groove 40 located near the junction of the cylinder with the web portion of the valve body and having an upper ledge 41. The axial length of the groove is sufficient to enable the needle to be retracted from fully closed to fully open position. Normally, the pitch of the threads in the coacting parts is such as to provide for this movement in about 5–6 turns of the cap thus contributing to rapid opening or closing of the valve when manually operated. A suitable means, such as a set screw 42, having an end 43 projecting into the groove and forming an abutment engageable against the ledge 41 when the valve has been fully opened is used, and this set screw is located closely adjacent the lower edge of the wall of the cap in order further to contribute to the low overall height of the valve. When the valve is fully open, the end of the screw lodges against the ledge and no further unscrewing action is possible until the screw itself is withdrawn as would be done in the complete disassembly of the structure in order to replace an O-ring, for example.

Considering now FIG. 3 wherein like parts are shown by the suffix "A," an elongated slot 50 having a relatively short width dimension is formed in the distal end of the cylinder 15A on its inner surface. In this arrangement the locations of the groove 34A and O-ring 35A axially of the needle 30A are such as to cause that O-ring to uncover the inner end of slot 50 when the valve is fully open (and corresponding to the positions described with respect to FIG. 2 when the end 43 of the screw lodges against ledge 41). As previously mentioned the clearance tolerance between threads 16A and 33A is greater than the tolerance between needle 30A and the bore in cylinder 15A with the result that when O-ring 35A uncovers slot 50 an observable seepage of fluid begins to take place below the cap 31A and the operator thus is warned that the cap should be slightly rescrewed toward closing position. Various practical advantages of the shapes embodied in the valve body piece and in the combined needle and actuator piece and forming objectives of the invention will be apparent to those skilled in the molding of plastics. For example, the only machining generally required upon the pieces after being molded comprises the cutting of the slot for the single O-ring and the tapering of the stem of the needle. Moreover, the formation of the arcuate inlet to passage 21 and of the arcuate outlet from passage 22 simultaneously provides for improved flow of the moldable plastic material around the coring members.

Having thus described the invention and its attendant advantages, it is intended that the appended claims are to cover such changes and modifications of the described invention as come within the true spirit and scope of the same.

What is claimed is:

1. A needle valve comprising a one-piece plastic valve body terminating in axially aligned tubular end portions and a one-piece plastic combined needle and actuator therefor, said valve body having an integral transversely extending web portion intermediate said tubular end portions and an externally threaded cylinder integral with said web portion and projecting laterally therefrom and having a needle guide bore therethrough, said web portion including a recess of circular cross section and communicating with said bore, said recess forming at its junction with said bore a circular valve seat of smaller diameter than said bore and constituted of deformable synthetic plastic material, an inlet passage communicating one tubular end of said body with said recess upstream of said seat, an outlet passage communicating said bore with the other tubular end of said body, said outlet passage entering said bore in spaced relation from said valve seat, said needle having a generally cylindrical form and terminating at its inner end in a generally conical configuration and constituted of deformable synthetic plastic material whereby movement of said conical portion of said needle against said seat results in mutual deformation of the contacting surfaces and effects a seal therebetween, said needle having at its outer end and integral therewith a rotatable hollow cap including a reentrant interiorly threaded wall adapted to coact with said externally threaded cylinder, an O-ring carried by said needle intermediate the ends thereof and engageable with the inner surface of said bore to prevent leakage of fluid along said needle during normal usage of said valve, and a slot in the inner wall surface of said cylinder of said valve body piece extending longitudinally toward said valve seat from the outer end of said cylinder, the inner end of said slot terminating at a point at which communication between said slot and the bore space beneath said O-ring is established when the needle and the O-ring carried thereby has moved outwardly of said bore to a predetermined extent signifying an approach to disengagement of said needle from said valve body piece.

2. A needle valve comprising a one-piece plastic valve body terminating in axially aligned tubular end portions and a one-piece plastic combined needle and actuator therefor, said valve body having an integral transversely extending web portion intermediate said tubular end portions and an externally threaded cylinder integral with said web portion and projecting laterally therefrom and having a needle guide bore therethrough, said web portion including a recess of circular cross-section and communicating with said bore, said recess forming at its junction with said bore a circular valve seat of smaller diameter than said bore and constituted of deformable synthetic plastic material, an inlet passage communicating one tubular end of said body with said recess upstream of said seat and having a larger cross-section at its junction with said one tubular end of said valve body than at its junction with said recess, an outlet passage communicating said bore with the other tubular end of said body and entering said bore in spaced relation to said valve seat, thereby to interpose a reinforcing wall section of the cylinder extending circumferentially around said needle between said valve seat and the entrance to said outlet passage, said needle having a generally cylindrical form and terminating at its inner end in a generally conical configuration and constituted of deformable synthetic plastic material whereby movement of said conical portion of said needle against said seat results in mutual deformation of the contacting surfaces and effects a seal therebetween, said needle having at its outer end and integral therewith a rotatable hollow cap including a re-entrant interiorly threaded well adapted to coact with said externally threaded cylinder, and an O-ring carried by said needle intermediate the ends thereof and engageable with the inner surface of said bore to prevent leakage of fluid along said needle during normal usage of said valve.

3. A needle valve comprising a one-piece plastic valve body terminating in axially aligned tubular end portions and a one-piece plastic combined needle and actuator therefor, said valve body having an integral transversely extending web portion intermediate said tubular end portions and an externally threaded cylinder integral with said web portion and projecting laterally therefrom and having a needle guide bore therethrough, said web portion including a recess of circular cross-section and communicating with said bore, said recess forming at its junction with said bore a circular valve seat of smaller diameter than said bore and constituted of deformable synthetic plastic material, an inlet passage communicating one tubular end of said body with said recess upstream of said seat, an outlet passage communicating said bore with the other tubular end of said body and entering said bore in spaced relation to said valve seat and having a larger cross-section at its junction with said other tubular end of said valve body than at its junction with said bore, thereby to interpose a reinforcing wall section of the cylinder extending circumferentially around said needle between said valve seat and the entrance to said outlet passage, said needle having a generally cylindrical form and terminating at its inner end in a generally conical configuration and constituted of deformable synthetic plastic material whereby movement of said conical portion of said needle against said seat results in mutual deformation of the contacting surfaces and effects a seal therebetween, said needle having at its outer end and integral therewith a rotatable hollow cap including a re-entrant interiorly threaded wall adapted to coact with said externally threaded cylinder, and an O-ring carried by said needle intermediate the ends thereof and engageable with the inner surface of said bore to prevent leakage of fluid along said needle during normal usage of said valve.

References Cited by the Examiner

UNITED STATES PATENTS

| | | | |
|---|---|---|---|
| 2,114,066 | 4/1938 | Wynkoop | 251—118 X |
| 2,630,291 | 3/1953 | Gifford et al. | 220—44 X |
| 2,669,415 | 2/1954 | Gilroy | 251—215 |
| 2,917,271 | 12/1959 | Banks | 251—214 X |

FOREIGN PATENTS

| | | |
|---|---|---|
| 834,329 | 11/1938 | France. |
| 1,108,402 | 8/1955 | France. |
| 1,157,089 | 5/1958 | France. |
| 1,249,752 | 11/1960 | France. |

ISADOR WEIL, *Primary Examiner.*

D. MATTHEWS, D. ROWE, *Assistant Examiners.*